US012183322B2

(12) United States Patent
Li et al.

(10) Patent No.: US 12,183,322 B2
(45) Date of Patent: Dec. 31, 2024

(54) LANGUAGE AGNOSTIC MULTILINGUAL END-TO-END STREAMING ON-DEVICE ASR SYSTEM

(71) Applicant: Google LLC, Mountain View, CA (US)

(72) Inventors: Bo Li, Fremont, CA (US); Tara N. Sainath, Jersey City, NJ (US); Ruoming Pang, New York, NY (US); Shuo-yiin Chang, Sunnyvale, CA (US); Qiumin Xu, Mountain View, CA (US); Trevor Strohman, Mountain View, CA (US); Vince Chen, Mountain View, CA (US); Qiao Liang, Mountain View, CA (US); Heguang Liu, Mountain View, CA (US); Yanzhang He, Palo Alto, CA (US); Parisa Haghani, Mountain View, CA (US); Sameer Bidichandani, Mountain View, CA (US)

(73) Assignee: Google LLC, Mountain View, CA (US)

( * ) Notice: Subject to any disclaimer, the term of this patent is extended or adjusted under 35 U.S.C. 154(b) by 278 days.

(21) Appl. No.: 17/934,555

(22) Filed: Sep. 22, 2022

(65) Prior Publication Data
US 2023/0108275 A1    Apr. 6, 2023

Related U.S. Application Data

(60) Provisional application No. 63/262,161, filed on Oct. 6, 2021.

(51) Int. Cl.
*G10L 15/00*    (2013.01)
*G10L 15/06*    (2013.01)
(Continued)

(52) U.S. Cl.
CPC .......... *G10L 15/005* (2013.01); *G10L 15/063* (2013.01); *G10L 15/22* (2013.01); *G10L 15/30* (2013.01); *G10L 2015/226* (2013.01)

(58) Field of Classification Search
CPC .......... G10L 15/04; G10L 15/14; G10L 15/22
See application file for complete search history.

(56) References Cited

U.S. PATENT DOCUMENTS

| 11,978,435 B2* | 5/2024 | Hori | G10L 15/16 |
| 2005/0256711 A1* | 11/2005 | Lahti | G10L 25/87 |
| | | | 704/E11.005 |

(Continued)

OTHER PUBLICATIONS

"Joint Endpointing and Decoding wiht End-to-End Models" Chang Shuo-Yiin et al. May 12, 2019.

(Continued)

*Primary Examiner* — Daniel Abebe
(74) *Attorney, Agent, or Firm* — Honigman LLP; Brett A. Krueger; Grant Griffith (57) ABSTRACT

A method includes receiving a sequence of acoustic frames characterizing one or more utterances as input to a multilingual automated speech recognition (ASR) model. The method also includes generating a higher order feature representation for a corresponding acoustic frame. The method also includes generating a hidden representation based on a sequence of non-blank symbols output by a final softmax layer. The method also includes generating a probability distribution over possible speech recognition hypotheses based on the hidden representation generated by the prediction network at each of the plurality of output steps and the higher order feature representation generated by the encoder at each of the plurality of output steps. The method also includes predicting an end of utterance (EOU) token at an end of each utterance. The method also includes classi- (Continued)

fying each acoustic frame as either speech, initial silence, intermediate silence, or final silence.

20 Claims, 6 Drawing Sheets (51) Int. Cl.
*G10L 15/22* (2006.01)
*G10L 15/30* (2013.01)

(56) References Cited

U.S. PATENT DOCUMENTS

2018/0314689 A1* 11/2018 Wang .................. G10L 15/1822
2020/0380215 A1   12/2020 Kannan et al.
2021/0166681 A1*  6/2021 Lu .......................... G10L 15/01
2021/0183373 A1   6/2021 Moritz et al.

OTHER PUBLICATIONS

International Search Report and Written Opinion for PCT application PC/US2022/076893 dated Dec. 21, 2022.

* cited by examiner

LANGUAGE AGNOSTIC MULTILINGUAL END-TO-END STREAMING ON-DEVICE ASR SYSTEM

CROSS REFERENCE TO RELATED APPLICATIONS

This U.S. patent application claims priority under 35 U.S.C. § 119(e) to U.S. Provisional Application 63/262,161, filed on Oct. 6, 2021. The disclosure of this prior application is considered part of the disclosure of this application and is hereby incorporated by reference in its entirety.

TECHNICAL FIELD

This disclosure relates to a language agnostic multilingual end-to-end streaming on-device ASR system.

BACKGROUND

On-device end-to-end (E2E) speech recognition models have shown quality improvements over conventional speech recognition models for single languages. More specifically, the quality improvements are measured by word error rates (WER) and latency, the delay between when a user stops speaking and the speech recognition model generates recognition results. E2E speech recognition models have also shown similar quality improvements over conventional speech recognition models capable of recognizing multilingual speech (e.g., several different languages). However, these E2E speech recognition models are not suitable for on-device streaming applications because of the increased model size required to recognize several different languages. Moreover, developing and updating speech recognition models capable of recognizing several different languages can be cumbersome to manage.

SUMMARY

One aspect of the disclosure provides a multilingual automated speech recognition (ASR) system that includes a multilingual ASR model including an encoder having a stack of multi-headed attention layers. The encoder is configured to receive a sequence of acoustic frames characterizing one or more utterances as input and generate, at each of a plurality of output steps, a higher order feature representation for a corresponding acoustic frame in the sequence of acoustic frames. The multilingual ASR model also includes a prediction network configured to receive, as input, a sequence of non-blank symbols output by a final softmax layer and generate, at each of the plurality of output steps, a hidden representation. The multilingual ASR model also includes a first joint network configured to receive, as input, the hidden representation generated by the prediction network at each of the plurality of output steps and the higher order feature representation generated by the encoder at each of the plurality of output steps and generate, at each of the plurality of output steps, a probability distribution over possible speech recognition hypotheses. The multilingual ASR model also includes a second joint network configured to receive, as input, the hidden representation generated by the prediction network at each of the plurality of output steps and the higher order feature representation generated by the encoder at each of the plurality of output steps and predict, as output, an end of utterance (EOU) token at an end of each utterance. The multilingual ASR system also includes a multilingual endpointer model configured to classify each acoustic frame in the sequence of acoustic frames as either speech, initial silence, intermediate silence, or final silence.

Implementations of the disclosure may include one or more of the following optional features. In some implementations, the multilingual ASR system further includes a microphone closer configured to trigger a microphone closing event in response to each EOU token predicted as output from the second joint network. In some examples, the multilingual ASR system further includes a microphone closer configured to trigger a microphone closing event in response to the multilingual endpointer model classifying an acoustic frame as final silence. In these examples, the multilingual endpointer model may branch from the encoder and share a computation of one of the multi-headed attention layers from the stack of multi-headed attention layers. In some implementations, the multilingual ASR model is trained using a two-stage training process. In these implementations, during a first stage of the two-stage training process, the encoder, the prediction network, and the first joint network are optimized for speech recognition quality and, during a second stage of the two-stage training process, the second joint network is initialized with the first joint network and parameters of the encoder, the prediction network, and the first joint network are frozen.

The multilingual ASR model may be trained on multilingual training utterances sampled from a plurality of different languages. Here, each multilingual training utterance may be concatenated with a corresponding domain identification (ID). The multilingual training utterances concatenated with a corresponding domain ID representing a voice search domain may include EOU training tokens and multilingual training utterances concatenated with a corresponding domain ID representing a domain other than the voice search domain do not include any EOU training tokens. In some implementations, the sequence of acoustic frames characterizes a first utterance spoken in a first language followed by a second utterance spoken in a second language different than the first language. In some examples, the stack of multi-headed attention layers includes a stack of conformer layers.

Another aspect of the disclosure provides a computer-implemented method that when executed on data processing hardware causes the data processing hardware to perform operations for performing language agnostic multilingual end-to-end streaming on-device. The operations include receiving a sequence of acoustic frames characterizing one or more utterances as input to a multilingual automated speech recognition (ASR) model. The operations also include generating, by an encoder of the multilingual ASR model at each of a plurality of output steps, a higher order feature representation for a corresponding acoustic frame in the sequence of acoustic frames. Here, the encoder includes a stack of multi-headed attention layers. The operations also include generating, by a prediction network of the multilingual ASR model at each of the plurality of output steps, a hidden representation based on a sequence of non-blank symbols output by a final softmax layer. The operations also include generating, by a first joint network of the multilingual ASR model at each of the plurality of output steps, a probability distribution over possible speech recognition hypotheses based on the hidden representation generated by the prediction network at each of the plurality of output steps and the higher order feature representation generated by the encoder at each of the plurality of output steps. The operations also include predicting, by a second joint network of the multi lingual ASR model, an end of utterance (EOU) token at an end of each utterance based on the hidden representation generated by the prediction network at each of the plurality of output steps and the higher order feature representation generated by the encoder at each of the plurality of output steps. The operations also include classifying, but a multilingual endpointer model, each acoustic frame in the sequence of acoustic frames as either speech, initial silence, intermediate silence, or final silence.

Implementations of the disclosure may include one or more of the following optional features. In some implementations, the operations further include triggering, by a microphone closer, a microphone closing event in response to each EOU token predicted as output from the second joint network. In some examples, the operations further include triggering, by a microphone closer, a microphone closing event in response to the multilingual endpointer classifying an acoustic frame as final silence. In these examples, the multilingual endpointer may branch from the encoder and share a computation of one of the multi-headed attention layers from the stack of multi-headed attention layers. In some implementations, the multilingual ASR model is trained using a two-stage training process. In these implementations, during a first stage of the two-stage training process, the encoder, the prediction network, and the first joint network are optimized for speech recognition quality and, during a second stage of the two-stage training process, the second joint network is initialized with the first joint network and parameters of the encoder, the prediction network, and the first joint network are frozen.

The multilingual ASR model may be trained on multilingual training utterances sampled from a plurality of different languages. Here, each multilingual training utterance may be concatenated with a corresponding domain identification (ID). Multilingual training utterance concatenated with a corresponding domain ID representing a voice search domain may include EOU training tokens and multilingual training utterances concatenated with a corresponding domain ID representing a domain other than the voice search domain do not include any EOU training tokens. In some implementations, the sequence of acoustic frames characterizes a first utterance spoken in a first language followed by a second utterance spoken in a second language different than the first language. In some examples, the stack of multi-headed attention layers includes a stack of conformer layers.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) systems can be configured to recognize the end of a spoken utterance, such as the end of a phrase, sentence, query, or command. Quickly and accurately determining that an utterance has ended is often important in order to provide accurate results with low latency. For example, if an ASR system prematurely ends the capture and processing of audio, the end of the user's utterance may be cut off and the resulting transcription may be incomplete or inaccurate. On the other hand, if an ASR system continues to wait for additional audio after an utterance has ended, the system may unnecessarily delay providing a response to the user. Thus, it is desirable to close a microphone on a user device as soon as a user has finished speaking, but without cutting off utterances prematurely. Moreover, for ASR systems capable of multilingual speech recognition this process is even further complicated with the different languages to attend to. Thus, multilingual ASR systems are often quite large such that they are not suitable for on-device streaming applications.

Accordingly, implementations herein are directed towards a multilingual ASR system suitable for language agnostic and on-device streaming ASR applications. More specifically, the multilingual ASR system includes an encoder that generates a higher order feature representation for a corresponding acoustic frame in a sequence of acoustic frames. The sequence of acoustic frames may correspond to utterances in different languages. In some instances, the sequence of acoustic frames correspond to a single utterance with a first portion in a first language and a second portion in a second language (i.e., code-switching). The multilingual ASR system also includes a first joint network that generates a probability distribution over possible speech recognition hypotheses (e.g., speech recognition result) based on the higher order feature representation and a hidden representation generated by a prediction network. A second joint network predicts and end of utterance (EOU) token at the end of each utterance based on the higher order feature representation and the hidden representation. A microphone closer may receive the EOU token and generate a microphone closing event based on the presence of the EOU token.

Figure 1:
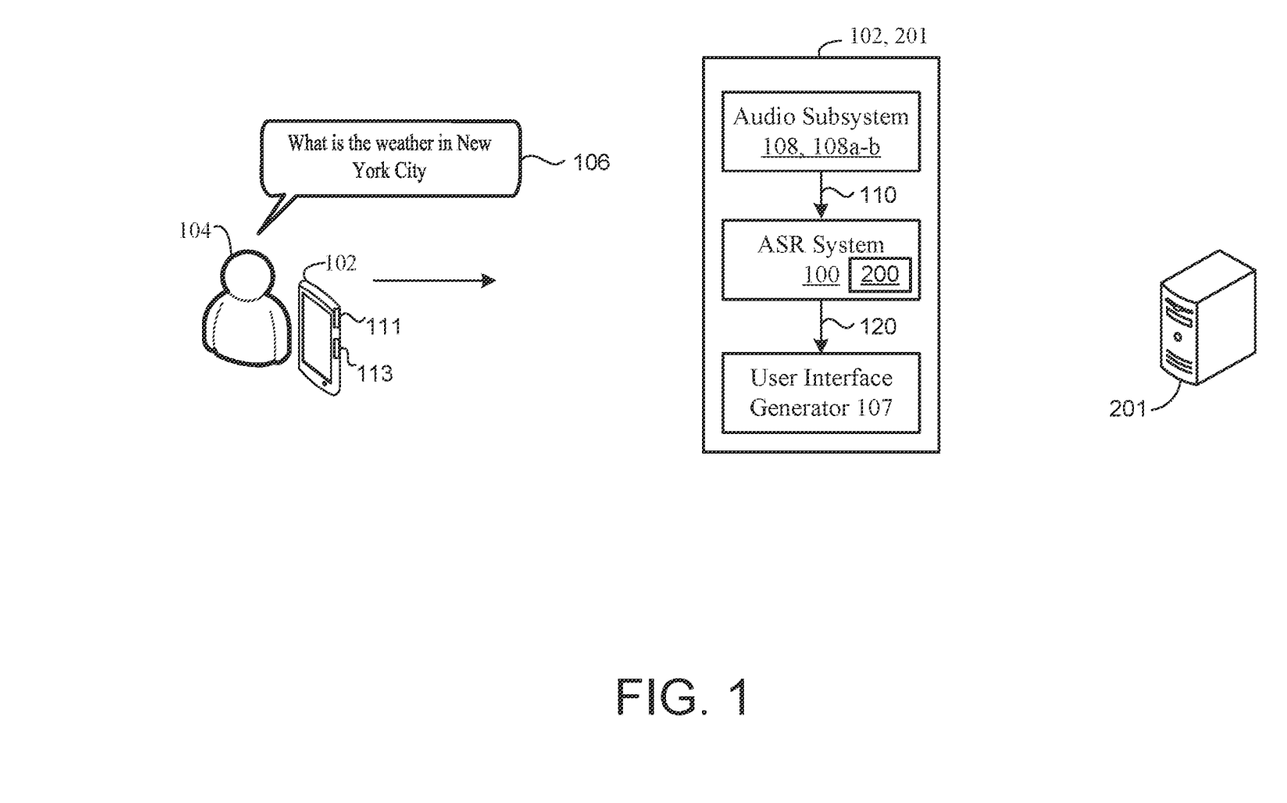
FIG. 1 is a schematic view of an example multilingual speech recognition system.

FIG. 1 illustrates an ASR system 100 implementing a multilingual ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 with an audio capture device (e.g., microphone) 108, 108a configured to receive an utterance 106 spoken by the user 104 and convert spoken utterances utterance 106 into a corresponding digital format associated with input acoustic frames 110 capable of being processed by the ASR system 100. The audio subsystem 108 may also include a speech output device (e.g., a speaker) 108, 108b for communicating an audible audio signal as output audio data from the user device 102. While the user device 102 implements a single audio capture device 108a in the example shown, the user device 102 may implement an array of audio capture devices 108a without departing from the scope of the present disclosure, whereby one or more capture devices 108a in the array may not physically reside on the user device 10, but be in communication with the audio subsystem 108.

In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the multilingual ASR model (e.g., ASR model) 200 receives, as input, the acoustic frames (i.e., sequence of input speech frames) 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

As will become apparent, the user device 102 may receive a microphone closing event 255 (FIG. 2) from the ASR model 200. In response to receiving the microphone closing event 255, the user device 102 may prevent the user device 102 from capturing any more audio data subsequent to the microphone closing event 255. For example, the user device 102 may deactivate or close the one or more microphones 108a. Moreover, the user device 102 may instruct the ASR model 200 to cease any active processing on the sequence of acoustic frames 110 and instruct the user device 102 to fulfill performance of the transcription 102 in response to the microphone closing event 255. As a result, speech recognition accuracy is improved since no subsequent speech or background noise is captured by the microphones 108a subsequent to the microphone closing event 255.

Figure 2:
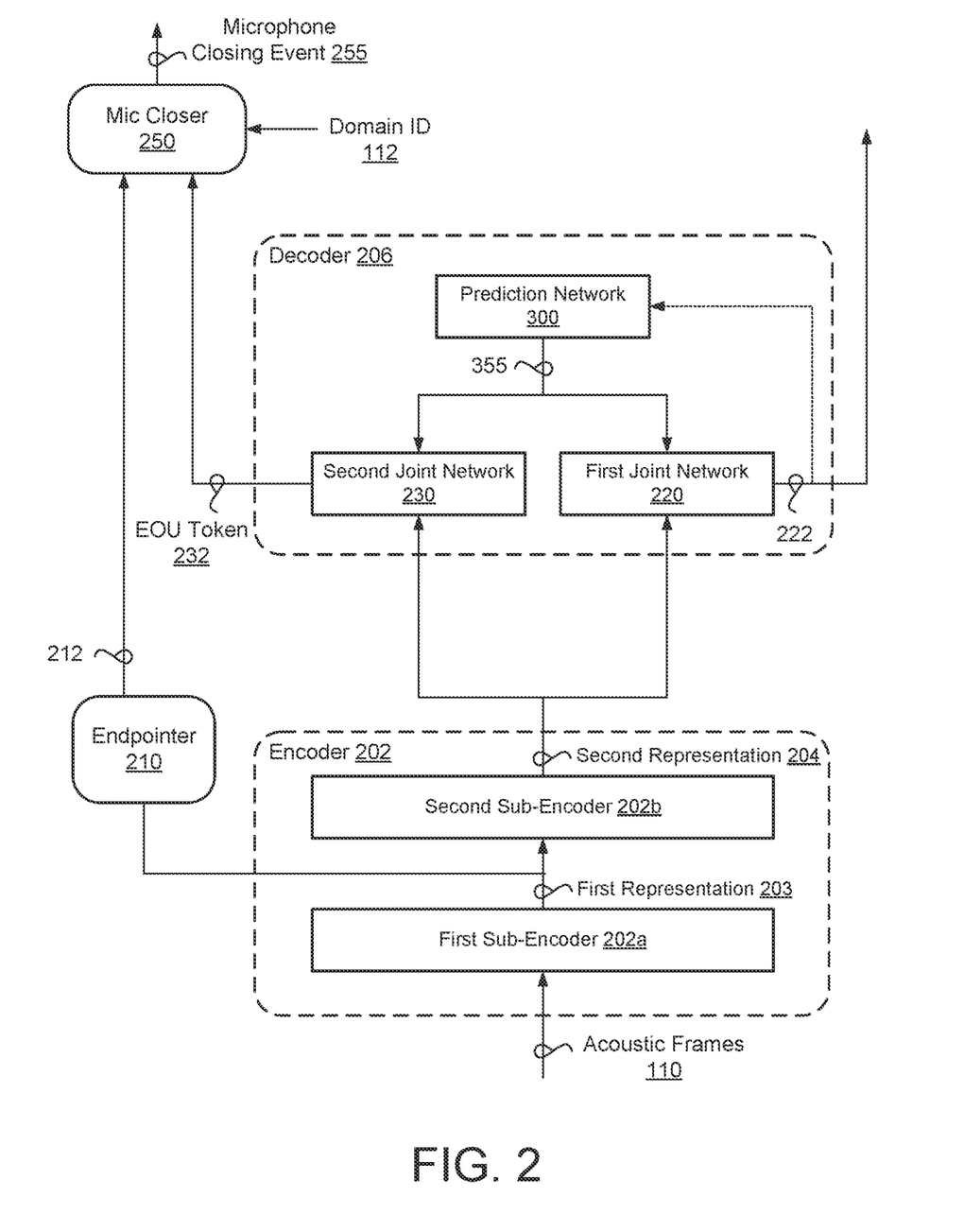
FIG. 2 is a schematic view of an example multilingual speech recognition model.

Referring now to FIG. 2, the ASR model 200 includes an encoder 202, a decoder 206, a multilingual endpointer model 210, and a microphone closer 250. The encoder 202 is configured to receive, as input, a sequence of acoustic frames 110 characterizing one or more utterances 106 (FIG. 1). The ASR model 200 is a multilingual ASR model configured to recognize utterances from a plurality of different languages. In particular, the ASR model 200 may train on multilingual training utterances sampled from a plurality of different languages. For example, a first multilingual training utterance may be spoken in the English language while a second multilingual training utterance may be spoken in the Dutch language. In some instances, the sequence of acoustic frames 110 for a multilingual training utterance characterizes a first portion in a first language followed by a second portion spoken in a second language different than the first language. For example, a multilingual training utterance of "de jager legt de roos on the chair" includes a first portion "de jager legt de roos" in the Dutch language and a second portion "on the chair" in the English language. A single multilingual training utterance having terms of one or more different languages is referred to as code-switching.

In some examples, the sequence of acoustic frames 110 corresponding to each multilingual training utterance is concatenated with a corresponding domain identification (ID) 112. The domain ID 112 indicates a speaking domain associated with the multilingual training utterance. For example, the domain ID 112 may represent a voice search/command domain, video meeting domain, or a diarization domain. As will become apparent, the microphone closer 250 may determine whether to generate a microphone closing event 255 based on an end of utterance token 232, a classification 212, or some combination thereof. For instance, the microphone closer 250 may generate the microphone closing event 255 based on the end of utterance token 232 for a sequence of acoustic frames 110 concatenated with a domain ID 112 indicating a voice search/command domain. In other instances, the microphone closer 250 may generate the microphone closing event 255 based on the classification 212 for a sequence of acoustic frames 110 concatenated with any domain ID 112 other than the voice search/command domain. Accordingly, multilingual training utterances concatenated with a corresponding domain ID 112 representing a voice search/command domain may include end of utterance training tokens for training the ASR model 200 while multilingual training utterances concatenated with a corresponding domain ID 112 representing a domain other than the voice search/command domain do not include any end of utterance training tokens 232 for training the ASR model 200.

The sequence of acoustic frames 110 may be previously processed by the audio subsystem 108 (FIG. 1) into parameterized acoustic frames (e.g., mel frames and/or spectral frames). In some implementations, the parameterized acoustic frames 110 correspond to log-mel filterbank energies with log-mel features. For instance, the parameterized input acoustic frames 110 representing the utterance 106 (FIG. 1) input into the encoder 202 may be represented as x=$(x_1, \ldots, x_T)$, where $x_t \in \mathbb{R}^d$ are log-mel filterbank energies, T denotes the number of frames in x, and d represents the number of log-Mel features. In some examples, each parameterized acoustic frames includes 128-dimensional log-mel features computed within a short shifting window (e.g., 32 milliseconds and shifted ever 10 milliseconds). Each feature may be stacked with previous frames (e.g., three (3) previous frames) to form a higher-dimensional vector (e.g., a 512-dimensional vector using the three previous frames). The features forming the vector may then be downsampled (e.g., to a 30 millisecond frame rate). For each acoustic frame 110 ($x_{1:T}$) in the sequence of acoustic frames 110 input to the encoder 202, the encoder 202 is configured to generate, at each output step, a second higher order feature representation 204 for a corresponding acoustic frame 110 in the sequence of acoustic frames 110.

In some implementations, the encoder 202 includes a stack of multi-headed attention layers that each include a multi-headed (e.g., 8-heads) self-attention mechanism. For instance, the stack of self-attention layers may include a stack of Conformer layers or Transformer layers. In the example shown, the encoder 202 includes a Conformer encoder including a stack of Conformer layers (e.g., 12 conformer layers) each of which includes a series of multi-headed self-attention, depth wise convolution, and feed-forward layers. Each Conformer layer performs causal convolutions and includes left-context attention to restrict the encoder 202 from using future acoustic frames 110 in the sequence of acoustic frames 110 to generate the second higher order feature representation 204.

As shown in FIG. 2, the encoder 202 includes a first sub-encoder 202, 202a and a second sub-encoder 202, 202b. The first sub-encoder 202a has an input projection layer and three (3) Conformer layers configured to generate, at each output step, a first higher order feature representation 203 for a corresponding acoustic frame 110 in the sequence of acoustic frames 110. The second sub-encoder 202b has a time stacking layer that concatenates two (2) adjacent outputs from the first sub-encoder 202a to form a 60 millisecond frame. The second sub-encoder 202b also includes a 1024-dimension Conformer layer, a projection layer, and eight (8) Conformer layers followed by a layer normalization. The second sub-encoder 202b is configured to receive, as input, the first higher order feature representation 203 and generate, at each output step, the second higher order feature representation 204.

The multilingual endpointer model 210 (also referred to as simply "endpointer 210") is configured to generate a classification 212 for each acoustic frame 110 indicating whether the respective acoustic frame 110 is an end of the utterance. The endpointer 210 branches from the encoder 202 and shares a computation of one of the multi-headed attention layers from the stack of multi-headed attention layers. More specifically, the endpointer 210 branches from the encoder 202 after the first sub-encoder 202a and before the stacking layer of the second sub-encoder 202b. In some examples, the endpointer 210 resides external from the encoder 202 while still sharing the computation of the first sub-encoder 202a, as shown in FIG. 2. In other examples, the endpointer resides at the encoder 202 and shares the computation of the first sub-encoder 202a (not shown). Thus, because the endpointer 210 shares computations with the encoder 204, both the endpointer 210 and the encoder 204 may be developed and updated synchronously.

Figure 4:
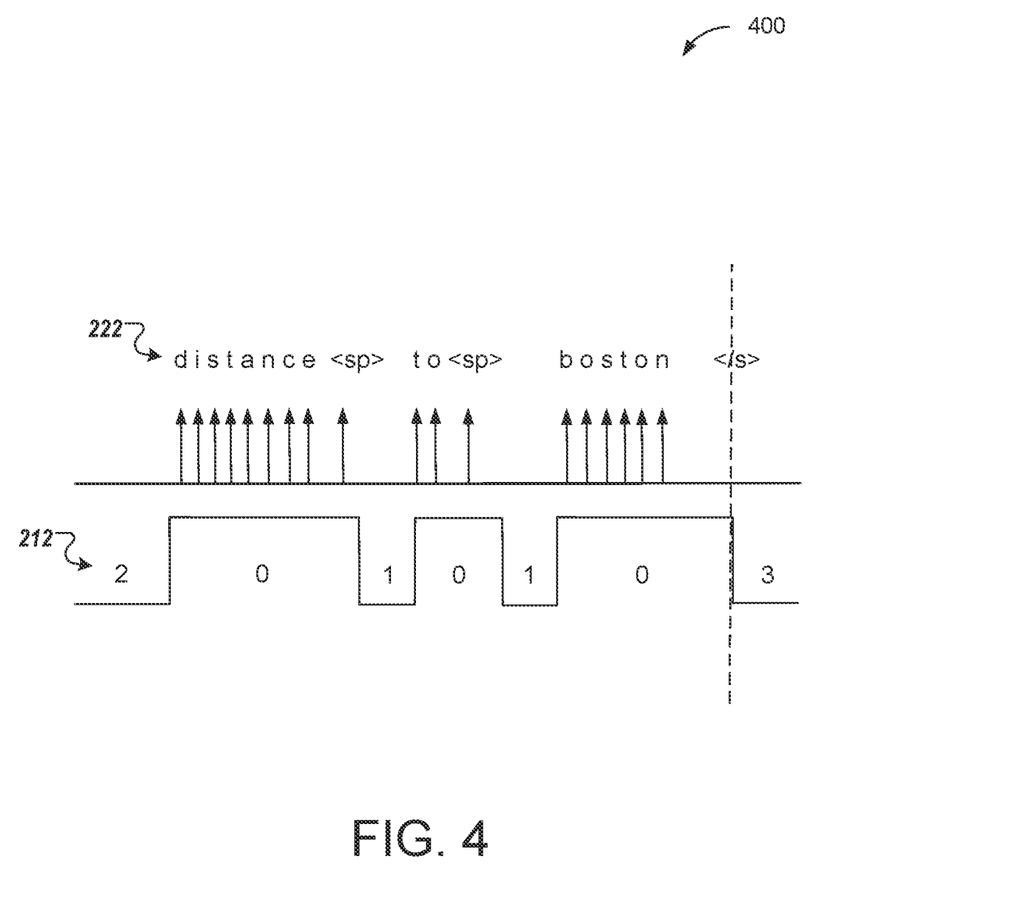
FIG. 4 shows a plot of a sequence classification labels predicted by a multilingual endpointer model.

The endpointer 210 is configured to receive, as input, the first higher order feature representation 203 generated by the first sub-encoder 202a at each of the plurality of output steps corresponding to the sequence of acoustic frames 110, and generate, at each output step, the classification 212 for the corresponding first higher order feature representation 203. The endpointer 210 sends the classification 212 for each acoustic frame 110 to the microphone closer 250. FIG. 4 shows a plot 400 of an example sequence of classifications 212 output by the endpointer 210 for an utterance 106 (FIG. 1) represented by a sequence of acoustic frames 110. The plot 400 also shows a corresponding speech recognition result 222 output by the first joint network 220 at a corresponding output step. In particular, the speech recognition result 222 shown in plot 400 corresponds to an utterance of "distance to Boston." Each classification 212 in the sequence of classifications 212 represent either speech ("0"), initial silence ("1"), intermediate silence ("2"), or final silence ("3"). When the endpointer 210 outputs a classification 212 indicating final silence for a respective acoustic frame 110 to the microphone closer 250, the microphone closer 250 is configured to trigger a microphone closing event 255. Alternatively, when the endpointer 210 outputs any classification 212 other than final silence to the microphone closer 250, the microphone closer 250 does not trigger a microphone closing event 255.

The endpointer 210 generates classifications 212 based solely on acoustic information of the first higher order feature representations 203 corresponding to the acoustic frames 110. That is, the endpointer 210 does not generate classifications 212 based on any information from linguistic information (e.g., hidden representation 355). Moreover, the endpointer 210 may determine that a probability of a classification 212 representing final silence grows over time throughout an utterance.

The decoder 206 may include a recurrent neural network-transducer (RNN-T) architecture having a first joint network 220, a second joint network 230, and a prediction network 300. The decoder 206 uses the joint networks 220, 230 to combine the second higher order feature representation 204 output by the encoder 202 and a hidden representation 355 output by the prediction network 300 to produce decoder outputs. More specifically, the first joint network 210 is configured to receive, as input, the hidden representation 355 generated by the prediction network 300 at each of the plurality of output steps and the higher order feature representation 204 generated by the encoder 202 at each of the plurality of output steps and generate, at each output step, a probability distribution 222 (y) over possible speech recognition hypotheses (e.g., output label).

The possible speech recognition hypotheses associated with the probability distribution 222 correspond to a set of output labels each representing a symbol/character in a specified natural language. For example, when the natural language is English, the set of output labels may include twenty-seven (27) symbols, e.g., one label for each of the 26-letters in the English alphabet and one label designating a space (<SP>). Accordingly, the first joint network 220 may output a set of values (e.g., probability distribution 222) indicative of the likelihood of occurrence of each of a predetermined set of output labels. This set of values can be a vector and can indicate the probability distribution 222 over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The probability distribution 222 output by the first joint network 220 can include a posterior probability value for each of the different output labels. Thus, if there are one-hundred (100) different output labels representing different graphemes or other symbols, the output (y) can include one-hundred (100) different probability values, one for each output label. The probability distribution 222 can then be used to select and assign scores to candidate orthographic elements (e.g., graphemes, wordpieces, and/or words) in a beam search process (e.g., by a final Softmax layer of the first joint network 220) for determining the transcription 120 (FIG. 1). That is, the first joint network 220 may output N-best speech recognition results having a highest probability from the corresponding probability distribution 222 over possible speech recognition hypotheses. As such, the probability distribution 222 over possible speech recognition hypotheses and speech recognition results 222 may be used interchangeably herein.

Although not illustrated, the first joint network may include a final Softmax layer that receives the probability distribution 222 over possible speech recognition hypotheses and performs a beam search process to select orthographic elements from the probability distribution 222 over possible speech recognition hypotheses. In some implementations, the final Softmax layer is separate from the first joint network 220. In other implementations, the final Softmax layer is integrated with the first joint network 220 such that the output of the first joint network 220 represents the output of the final Softmax layer.

Figure 3:
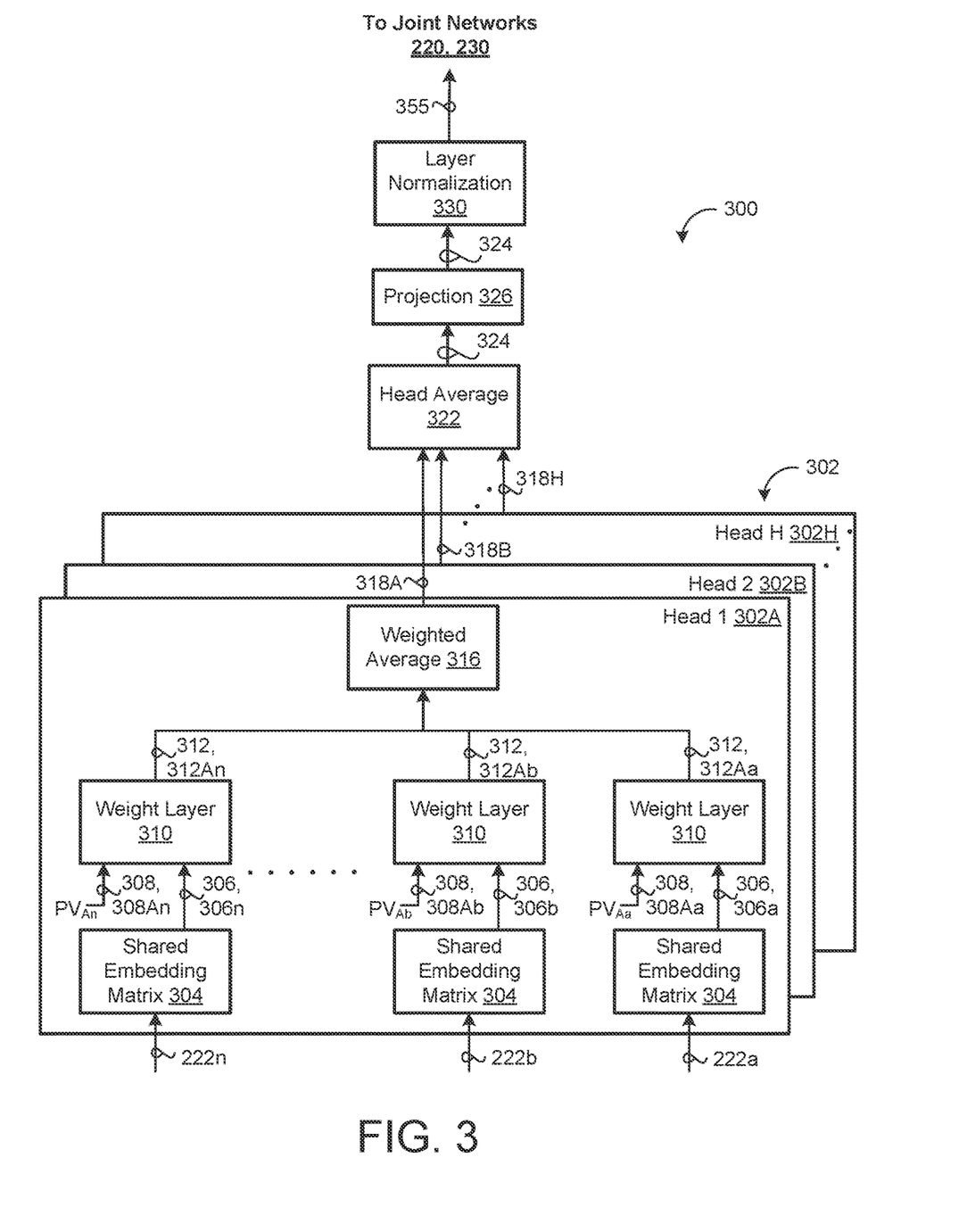
FIG. 3 is a schematic view of an example prediction network of the multilingual speech recognition model of FIG. 2.

FIG. 3 shows the prediction network 300 of the ASR model 200 receiving, as input, a sequence of non-blank symbols that is limited to the N previous non-blank symbols output by the final Softmax layer of the first joint network 220 and generate, at each output step, a hidden representation 355. That is, the sequence non-blank symbols 222, 222a-n output by the final Softmax layer of the first joint network 220 may correspond to non-blank symbols of the speech recognition result 222. Thus, the sequence non-blank symbols 222 and the second pass speech recognition hypothesis 222 may used interchangeably herein. In some examples, N is equal to two. In other examples, N is equal to five, however, the disclosure is non-limiting and N may equal any integer. In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 222 among the sequence of non-blank symbols 222 received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 222. The respective position vector PV 308 assigned to each non-blank symbol indicates a position in the history of the sequence of non-blank symbols (e.g., the N previous non-blank symbols output by the final Softmax layer of the first joint network 220). For instance, the first position vector $PV_{Aa}$ is assigned to a most recent position in the history, while the last position vector $PV_{An}$ is assigned to a last position in the history of the N previous non-blank symbols output by the final Softmax layer of the first joint network 220. Notably, each of the embeddings 306 may include a same dimensionality (i.e., dimension size) as each of the position vectors PV 308.

While the corresponding embedding generated by shared embedding matrix 304 for each for each non-blank symbol 120b among the sequence of non-blank symbols 222, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302H defines another different row of position vectors $PV_{Ha-Hn}$ 308$_{Ha-Hn}$.

For each non-blank symbol 222 in the sequence of non-blank symbols 222 received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X,P) = \frac{1}{H*N} \sum_{h,n} X_n * \sum_e (X_{n,e} * P_{h,n,e}) \qquad (1)$$

In Equation 1, h represents the index of the heads 302, n represents position in context, and e represents the embedding dimension. Additionally, in Equation 1, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector (e.g., hidden representation) 355 at the corresponding time step from the plurality of time steps. The prediction network 300 generates only a single embedding vector 355 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector 350.

Referring back to FIG. 2, the second joint network 230 is configured predict an end of utterance (EOU) token 232 indicating the end of an utterance. Advantageously, the second joint network 230 generates the EOU token 232 based on additional linguistic contexts, namely, the hidden representation 355. Stated differently, the second joint network 230 processes the additional linguistic contexts thereby providing a more accurate EOU prediction as compared to the acoustic-based classification 212 of the endpointer 210.

The second joint network 230 is configured to receive, as input, the hidden representation 355 generated by the prediction network 300 at each of the plurality of output steps and the higher order feature representation 204 generated by the encoder 202 at each of the plurality of output steps and predict and the EOU token 232 at the end of each utterance 106 (FIG. 1). The second joint network 230 may output the EOU token 232 to the microphone closer 250 when the second joint network 230 determines the second higher order feature representation 204, at a respective output step, represents the end of the utterance 106 (FIG. 1). That is, the second joint network 230 may determine, at each output step, a score indicating a likelihood that the respective second higher order feature representation 204 corresponds to the end of the utterance 106 (FIG. 1) based on the hidden representation 355 and the second higher order feature representation 204. When the score satisfies a score threshold, the second joint network 230 outputs the EOU token 232 to the microphone closer 250. When the score does not satisfy the score threshold, the second joint network 230 refrains from outputting the EOU token 232 to the microphone closer 250. Accordingly, the microphone closer 250 triggers a microphone closing event 255 in response to each EOU token 232 predicted as output from the second joint network 230 and send the microphone closing event 255 to the user device 102 (FIG. 1) to close the one or more microphones 108a (FIG. 1).

The microphone closer 250 may receive the classification 212 and the EOU token 232 (or not receive the EOU token 232 when the second joint network 230 does not generate EOU token 232) corresponding to each acoustic frame 110 in the sequence of acoustic frames. Thereafter, the microphone closer 250 may determine whether to generate the microphone closing event 255 based on the classification 212 or the EOU 232 for the acoustic frame 110. In particular, the microphone closer 250 may base the determination on the domain ID 112 associated with the sequence of acoustic frames 110. For example, the microphone closer 250 may generate the microphone closing event 255 based on the presence of the EOU token 232 when the domain ID 112 indicates the voice search/command domain. In particular, the microphone closer 250 relies on the EOU token 232 for voice search/command domain utterances because these utterances do not include long pauses that are often included in utterances associated with other domains such as video meetings or diarization. As such, the microphone closer 250 may reduce its latency in generating the microphone closing event 255 for voice search/command domain utterances using the EOU token 232 without quality degradations (e.g., generating microphone closing events 255 too early) for utterances of other domains.

The ASR model 200 may be trained using a two-stage training process. During the first stage of the two-stage training process, the encoder 202, the prediction network 300, and the first joint network 220 are optimized for speech recognition quality. That is, during the first stage these components are optimized for minimal word error rate (WER) and/or minimal latency. During the second stage of the two-stage training process, the second joint network 230 is initialized with the first joint network 220, and parameters of the encoder 202, the prediction network 300, and the first joint network 210 are frozen based on the parameters learned during the first stage. In particular, the second joint network 230 initializes using the parameters of the first joint network 220 learned during the first stage. Thereafter, during the second stage, the second joint network further 230 further refines the parameters.

Figure 5:
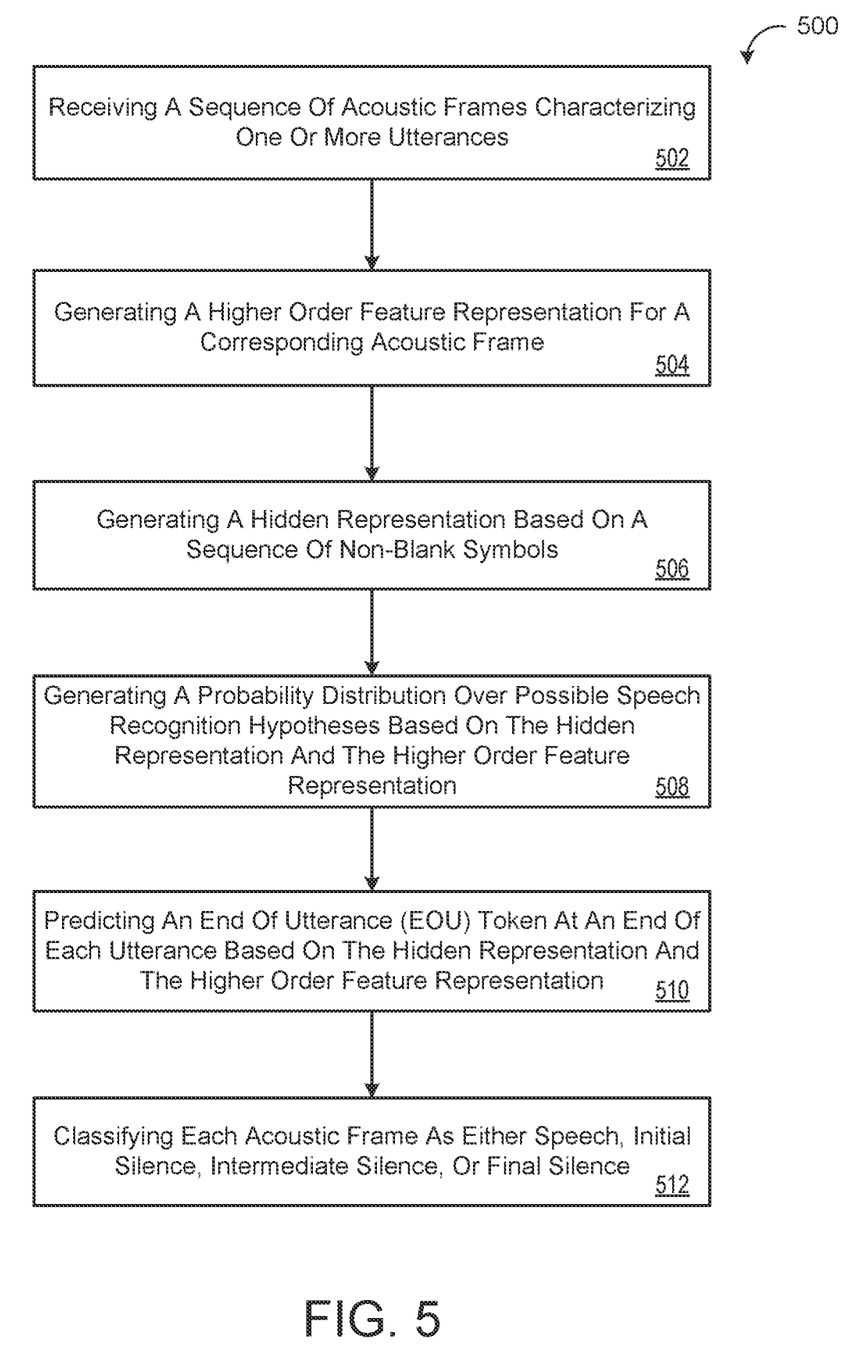
FIG. 5 is a flowchart of an example arrangement of operations for a computer-implemented method of performing language agnostic multilingual end-to-end streaming on-device.
Figure 6:
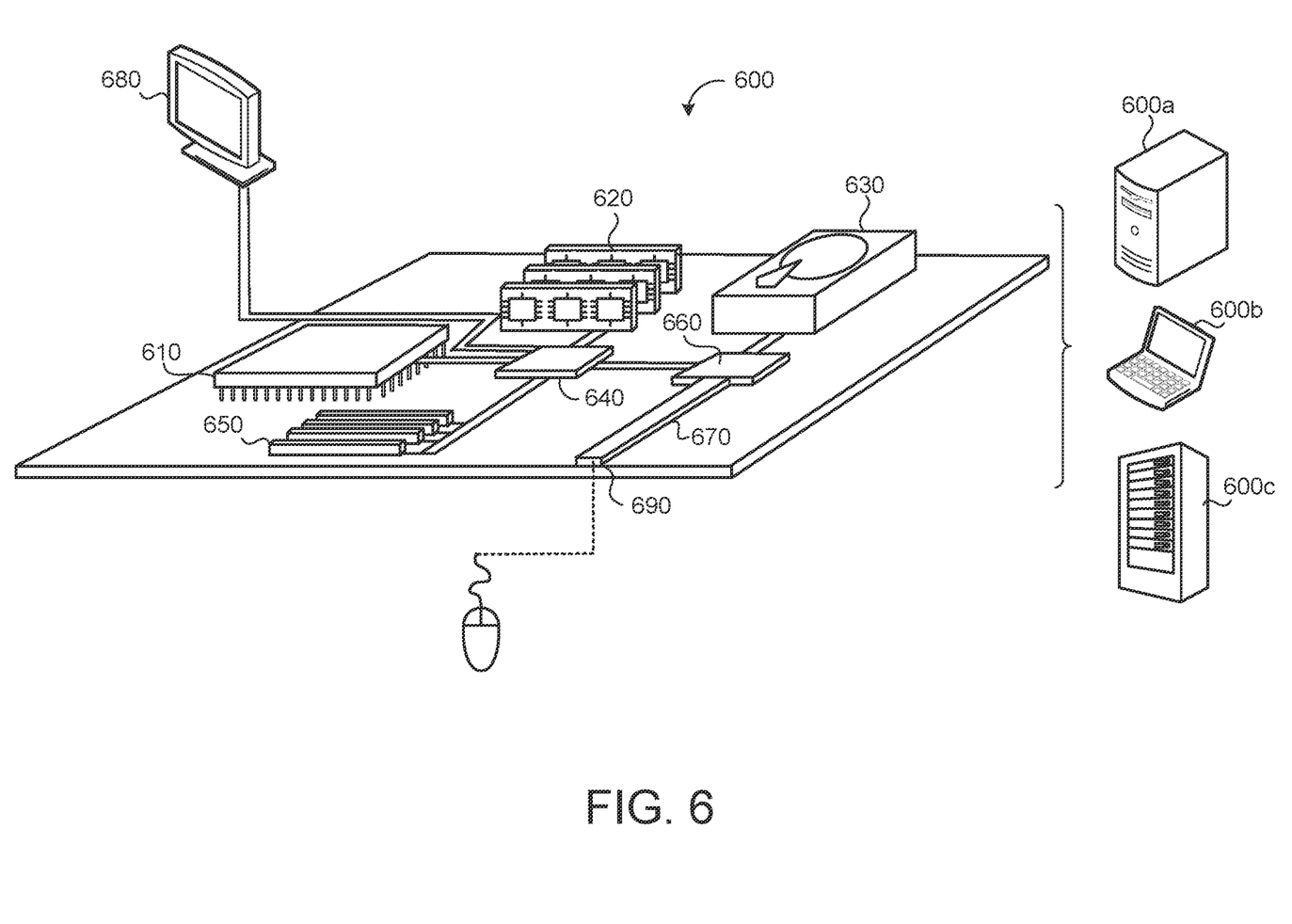
FIG. 6 is a schematic view of an example computing device that may be used to implement the systems and methods described herein.

FIG. 5 is a flowchart of an example arrange of operations for a method 500 of performing language agnostic multilingual end-to-end streaming on-device. The method 500 may execute on data processing hardware 610 (FIG. 6) using instructions stored on memory hardware 620 (FIG. 6). The data processing hardware 610 and the memory hardware 620 may reside on the user device 102 and/or the remote computing device 60 of FIG. 1 corresponding to a computing device 600 (FIG. 6).

At operation 502, the method 500 includes receiving a sequence of acoustic frames 110 characterizing one or more utterances 106 as input to an encoder 202 of a multilingual ASR model 200. At operation 504, the method 500 includes generating, by the encoder 202, a higher order feature representation (e.g., second higher order feature representation) 204 for a corresponding acoustic frame 110 in the sequence of acoustic frames 110 at each of a plurality of output steps. Here, the encoder 202 includes a stack of multi-headed attention layers. At operation 506, the method 500 includes generating, by a prediction network 300 at each of the plurality of output steps, a hidden representation 355 based on a sequence of non-blank symbols 222 output by a final softmax layer of a first joint network 220. At operation 508, the method 500 includes generating, by the first joint network 220 at each of the plurality of output steps, a probability distribution 222 over possible speech recognition hypotheses based on the hidden representation 355 generated by the prediction network 300 at each of the plurality of output steps and the higher order feature representation 204 generated by the encoder 204 at each of the plurality of output steps. At operation 510, the method 500 includes predicting, by a second joint network 230, an end of utterance (EOU) token 232 at an end of each utterance based on the hidden representation 355 generated by the prediction network 300 at each of the plurality of output steps and the higher order feature representation 204 generated by the encoder 204 at each of the plurality of output steps. At operation 512, the method 500 includes classifying, by a multilingual endpointer model 210, each acoustic frame 100 in the sequence of acoustic frames 110 as either speech, initial silence, intermediate silence, or final silence.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A multilingual automated speech recognition (ASR) system comprising:
    a multilingual ASR model comprising:
        an encoder comprising a stack of multi-headed attention layers, the encoder configured to:
            receive, as input, a sequence of acoustic frames characterizing one or more utterances; and
            generate, at each of a plurality of output steps, a higher order feature representation for a corresponding acoustic frame in the sequence of acoustic frames;
        a prediction network configured to
            receive, as input, a sequence of non-blank symbols output by a final softmax layer; and
            generate, at each of the plurality of output steps, a hidden representation;
        a first joint network configured to:
            receive, as input, the hidden representation generated by the prediction network at each of the plurality of output steps and the higher order feature representation generated by the encoder at each of the plurality of output steps; and
            generate, at each of the plurality of output steps, a probability distribution over possible speech recognition hypotheses;
        a second joint network configured to:
            receive, as input, the hidden representation generated by the prediction network at each of the plurality of output steps and the higher order feature representation generated by the encoder at each of the plurality of output steps; and
            predict, as output, an end of utterance (EOU) token at an end of each utterance; and
        a multilingual endpointer model configured to classify each acoustic frame in the sequence of acoustic frames as either speech, initial silence, intermediate silence, or final silence.

2. The multilingual ASR system of claim 1, further comprising a microphone closer configured to trigger a microphone closing event in response to each EOU token predicted as output from the second joint network.

3. The multilingual ASR system of claim 1, further comprising a microphone closer configured to trigger a microphone closing event in response to the multilingual endpointer model classifying an acoustic frame as final silence.

4. The multilingual ASR system of claim 3, wherein the multilingual endpointer model branches from the encoder and shares a computation of one of the multi-headed attention layers from the stack of multi-headed attention layers.

5. The multilingual ASR system of claim 1, wherein:
    the multilingual ASR model is trained using a two-stage training process;
    during a first stage of the two-stage training process, the encoder, the prediction network, and the first joint network are optimized for speech recognition quality; and
    during a second stage of the two-stage training process, the second joint network is initialized with the first joint network and parameters of the encoder, the prediction network, and the first joint network are frozen.

6. The multilingual ASR system of claim 1, wherein the multilingual ASR model is trained on multilingual training utterances sampled from a plurality of different languages.

7. The multilingual ASR system of claim 6, wherein each multilingual training utterance is concatenated with a corresponding domain identification (ID).

8. The multilingual ASR system of claim 7, wherein:
    multilingual training utterances concatenated with a corresponding domain ID representing a voice search domain comprise EOU training tokens; and
    multilingual training utterances concatenated with a corresponding domain ID representing a domain other than the voice search domain do not include any EOU training tokens.

9. The multilingual ASR system of claim 1, wherein the sequence of acoustic frames characterizes a first utterance spoken in a first language followed by a second utterance spoken in a second language different than the first language.

10. The multilingual ASR system of claim 1, wherein the stack of multi-headed attention layers comprises a stack of conformer layers.

11. A computer-implemented method when executed by data processing hardware causes the data processing hardware to perform operations comprising:
    receiving, as input to a multilingual automated speech recognition (ASR) model, a sequence of acoustic frames characterizing one or more utterances;
    generating, by an encoder of the multilingual ASR model, at each of a plurality of output steps, a higher order feature representation for a corresponding acoustic frame in the sequence of acoustic frames, wherein the encoder comprises a stack of multi-headed attention layers;
    generating, by a prediction network of the multilingual ASR model, at each of the plurality of output steps, a hidden representation based on a sequence of non-blank symbols output by a final softmax layer;
    generating, by a first joint network of the multilingual ASR model, at each of the plurality of output steps, a probability distribution over possible speech recognition hypotheses based on the hidden representation generated by the prediction network at each of the plurality of output steps and the higher order feature representation generated by the encoder at each of the plurality of output steps;

predicting, by a second joint network of the multilingual ASR model, an end of utterance (EOU) token at an end of each utterance based on the hidden representation generated by the prediction network at each of the plurality of output steps and the higher order feature representation generated by the encoder at each of the plurality of output steps; and classifying, by a multilingual endpointer model, each acoustic frame in the sequence of acoustic frames as either speech, initial silence, intermediate silence, or final silence.

12. The computer-implemented method of claim 11, wherein the operations further comprise triggering, by a microphone closer, a microphone closing event in response to each EOU token predicted as output from the second joint network.

13. The computer-implemented method of claim 11, wherein the operations further comprise triggering, by a microphone closer, a microphone closing event in response to the multilingual endpointer model classifying an acoustic frame as final silence.

14. The computer-implemented method of claim 13, wherein the multilingual endpointer branches from the encoder and shares a computation of one of the multi-headed attention layers from the stack of multi-headed attention layers.

15. The computer-implemented method of claim 11, wherein:
the multilingual ASR model is trained using a two-stage training process;
during a first stage of the two-stage training process, the encoder, the prediction network, and the first joint network are optimized for speech recognition quality; and
during a second stage of the two-stage training process, the second joint network is initialized with the first joint network and parameters of the encoder, the prediction network, and the first joint network are frozen.

16. The computer-implemented method of claim 11, wherein the multilingual ASR model is trained on multilingual training utterances sampled from a plurality of different languages.

17. The computer-implemented method of claim 16, wherein each multilingual training utterance is concatenated with a corresponding domain identification (ID).

18. The computer-implemented method of claim 17, wherein:
multilingual training utterances concatenated with a corresponding domain ID representing a voice search domain comprise EOU training tokens; and
multilingual training utterances concatenated with a corresponding domain ID representing a domain other than the voice search domain do not include any EOU training tokens.

19. The computer-implemented method of claim 11, wherein the sequence of acoustic frames characterizes a first utterance spoken in a first language followed by a second utterance spoken in a second language different than the first language.

20. The computer-implemented method of claim 11, wherein the stack of multi-headed attention layers comprises a stack of conformer layers.

* * * * *